United States Patent [19]

Babour et al.

[11] Patent Number: 5,642,051

[45] Date of Patent: Jun. 24, 1997

[54] METHOD AND APPARATUS FOR SURVEYING AND MONITORING A RESERVOIR PENETRATED BY A WELL INCLUDING FIXING ELECTRODES HYDRAULICALLY ISOLATED WITHIN A WELL

[75] Inventors: Kamal Babour, Bures Sur Yvette, France; Ashok Kumar Belani, Dubai, United Arab Emirates; Bronislaw Seeman, Paris, France

[73] Assignee: Schlumberger Technology Corporation, Houston, Tex.

[21] Appl. No.: 340,837

[22] Filed: Nov. 17, 1994

[30] Foreign Application Priority Data

Nov. 17, 1993 [FR] France .................................. 93 13720

[51] Int. Cl.$^6$ ............................................. G01V 3/02
[52] U.S. Cl. ............................................. 324/357
[58] Field of Search ................................. 324/347, 351, 324/354, 355, 357, 366, 368, 371, 372, 373; 166/250, 65.1

[56] References Cited

U.S. PATENT DOCUMENTS

| | | | |
|---|---|---|---|
| 2,393,009 | 1/1946 | Chun | 324/366 X |
| 3,057,409 | 10/1962 | Grossman, Jr. | 324/347 X |
| 3,690,164 | 9/1972 | Gabillard et al. | 324/357 X |
| 3,758,846 | 9/1973 | Ryss et al. | 324/357 |
| 3,849,722 | 11/1974 | Nilsson | 324/357 |
| 4,412,180 | 10/1983 | Desbrandes . | |
| 4,475,591 | 10/1984 | Cooke, Jr. . | |
| 4,730,671 | 3/1988 | Perkins . | |
| 4,796,186 | 1/1989 | Kaufman | 324/368 |
| 4,828,051 | 5/1989 | Titchener et al. . | |
| 4,875,015 | 10/1989 | Ward . | |
| 4,912,415 | 3/1990 | Sorensen . | |
| 4,942,361 | 7/1990 | Gast et al. | 324/357 |
| 5,184,682 | 2/1993 | Delacor et al. . | |
| 5,214,384 | 5/1993 | Sprunt et al. . | |

*Primary Examiner*—Sandra L. O'Shea
*Assistant Examiner*—Roger Phillips
*Attorney, Agent, or Firm*—John J. Ryberg

[57] ABSTRACT

Apparatus and method for monitoring a fluid reservoir traversed by at least one well comprising the placing of at least one electrode communicating to the surface and fixed in permanent manner in the well. Hydraulically isolating the section of the well in which it is located from the rest of the well and providing electrical coupling between the electrode and the reservoir. Subsequently, a current is passed through the reservoir; and an electrical parameter is measured, whereby a characteristic representative of the reservoir can be deduced.

26 Claims, 4 Drawing Sheets

METHOD AND APPARATUS FOR SURVEYING AND MONITORING A RESERVOIR PENETRATED BY A WELL INCLUDING FIXING ELECTRODES HYDRAULICALLY ISOLATED WITHIN A WELL

BACKGROUND OF THE INVENTION

1. Field of the Invention

The present invention relates to techniques for monitoring and surveying a hydrocarbon reservoir penetrated by a well. More particularly the invention concerns a method, and a device for its implementation, in which at least two electrodes are located in the well, spaced apart from each other along the length of the well and connected to a current source and to means for measuring an electrical parameter, from which a characteristic of the reservoir is deduced. The parameter is the potential or the current and the characteristic of the reservoir is the resistivity of the geological formations forming the reservoir.

2. Related Art

The production of hydrocarbons needs to be controlled and monitored regularly or continuously, in order to determine the cause of any reduction or stoppage in production and in order to attempt to remedy it. Apart from depending on the installed production facility, production also depends on characteristics of the reservoir, not only static characteristics (i.e. porosity) but also dynamic characteristics (intercommunication between the pores, permeability, etc.). An important item of information in this respect is the position in the reservoir of the hydrocarbon/water or hydrocarbon/gas interface.

It is of fundamental importance not only to detect a possible pocket of water or gas but to know its position at any given time, in order to avoid the water reaching the production well.

The electrical resistivity of the ground is used in a known manner as a representative characteristic of the reservoir. The resistivity of hydrocarbons is much higher than the resistivity of the formation water which carries salt (in a ratio of around 100 to 1). The measurement is effected upon drilling the production well, with a logging sonde having electrodes or with an induction sonde, means being provided to allow the resistivity of the strata which is traversed by the well to be determined.

The presence of the casing, needed for production, presents an obstacle to sondes employing electrical measurements. Moreover, most types of sondes for well logging have a depth of investigation of the order of one meter around the production well and thus do not allow the characteristics of reservoirs to be surveyed on a large scale.

In this context the present invention provides a method and a device for surveying, monitoring and making measurements on the reservoir itself, without affecting production, and in particular for enabling the position of the hydrocarbon/water interface to be determined, with a view to optimizing production.

According to an aspect of the invention, there is provided a method of monitoring a fluid reservoir penetrated by at least one well, comprising the following steps:

at least one electrode is fixed in permanent manner in the well and communicating with the surface under conditions for hydraulically isolating the section of the well in which it is located from the rest of the well and for providing electrical coupling between the electrode and the reservoir;

a current is passed through the reservoir; and an electrical parameter is measured and a characteristic representative of the reservoir is deduced therefrom.

According to another aspect, there is provided a device including several electrodes disposed on a support adapted to maintain between the electrodes a spacing which is absolutely constant with time and to insulate the electrodes from each other.

In an embodiment of the invention, more particularly applicable to a production well passing through two regions containing different hydrocarbons, the support is formed by a section of rigid metallic casing, with an associated electrically insulating coating.

In another embodiment, more particularly applicable to an uncased well, drilled specifically for measurement purposes and separate from the production well, the support is formed by an elongate member of flexible or semi-rigid, electrically insulating material.

In a further embodiment, the device includes a cable having a plurality of insulated conductors within an outer sheath, each conductor having its end portion exposed to form a respective electrode.

The electrodes are advantageously fixed in the well by cement injected between the electrodes and the wall of the well.

The cement preferably has electrical resistivity in the same order as that of the ground of the reservoir.

In another embodiment of the invention, a plurality of measuring electrodes and a current injection electrode are fixed in the well, in a permanent manner.

Different measurements are effected at at least one intermediate electrode and relative to different electrodes providing current return.

In a variant of the invention, an injection electrode, a return electrode, a reference electrode and one or more intermediate measuring electrode(s) are used, the measuring electrode(s) not being connected to the injection electrode, and the potential difference is measured between the intermediate electrode(s) or between the intermediate electrode (s) and the reference electrode.

In order to follow the movement of the hydrocarbon/water interface, measurements spaced apart in time are made, and the difference between the measurements is calculated in order to determine a parameter representative of the movement of said interface.

The injection electrode or current source preferably generates a continuous current, or a low frequency alternating current.

According to a further aspect of the invention, there is provided a device for monitoring a fluid reservoir penetrated by at least one well, comprising a support on which are fixed longitudinally spaced apart electrodes, the electrodes being adapted to be connected to a current source or electrode and to means for measuring an electrical parameter (potential or current), in such a manner that each electrode can act equally well as a current electrode or as a measuring electrode.

The invention further provides an installation for monitoring a fluid reservoir penetrated by at least one well, comprising:

means, including a current source, for passing current through the reservoir;

means for measuring potential or current; and at least one measuring electrode fixed in a permanent manner in the well in the region of the reservoir and communicating with the surface under conditions hydraulically isolating the section of the well in which it is located from the rest of the well and providing electrical coupling between the electrode and the reservoir.

BRIEF DESCRIPTION OF THE DRAWINGS

The invention will be better understood in the light of the description which follows, referring to illustrative, non-limiting embodiments, with reference to the accompanying drawings, in which.

DESCRIPTION OF THE PREFERRED EMBODIMENTS

Figure 1:
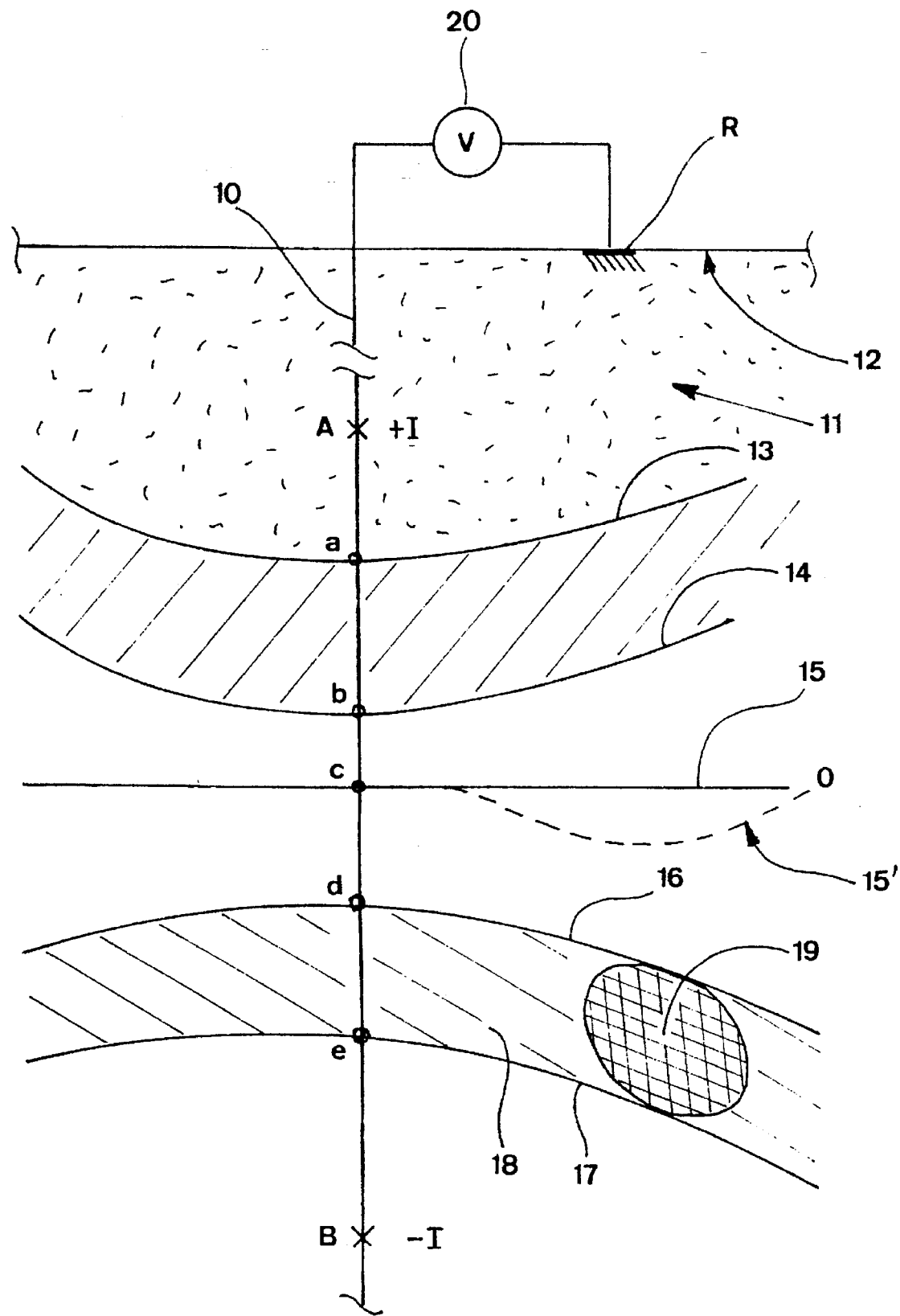
FIG. 1 is a schematic illustration of the general context of the invention.

As shown schematically in FIG. 1, a well 10 is drilled in ground formations 11, the well 10 opening at the surface 12. The well can have a depth varying from some hundreds of meters to several kilometers, and it passes through a certain number of distinct, successive rock and geological formations.

A current +I is injected from the surface at a point A by a conductive electrode in contact with the wall of the well and thus the corresponding ground formation, and a second electrode B is positioned so that it is longitudinally spaced apart along the well at a depth greater than the electrode A. In theory it is possible to trace curves called equipotential lines and denoted by the general references 13, 14, 15, 16 and 17, it being understood that only some curves have been shown, for reasons of clarity. The curve 15 is a straight line representing the level of zero current. The equipotential curves located between the zero curve 15 and the electrode A are concave towards the surface, while the equipotential curves between the curve 15 of zero level and the electrode B are concave in the opposite direction.

A hatched region 18 bounded by the equipotential lines 16 and 17 corresponds to a region producing hydrocarbons. A cross-hatched region 19 has been shown inside this same layer and symbolizes a pocket of generally saline water. In fact geological strata producing hydrocarbons frequently contain regions or pockets of water and/or gas.

It is desirable to allow the water pocket 19 to be located and to determine its movement or advance towards the well.

Points corresponding to measuring electrodes fixed in the well, in contact with the geological formations, are denoted by the letters a, b, c, d, e. The electrodes a to e each correspond to an equipotential curve, in order to facilitate understanding of the figure.

The potential difference between a reference electrode R and each electrode a to e located in the well and in contact with the geological formations is measured by means of the potentiometer 20, the reference electrode being preferably located on the surface, at some distance from the head of the well for example, under conditions ensuring stability of its characteristics with time. Other things being equal, the measured potential values depend on the resistivity of the geological formations encountered.

The presence of the pocket of water or gas 19 has an effect on the geometry of the equipotential curves and thus affects the measurements of the potential differences carried out at each of the electrodes a to e. The deformation of equipotential curve 15 is indicated symbolically by a broken line curve 15', it being understood that all of the curves, particularly those near the pocket 19, are also deformed. This deformation tends to affect the measurement at each of the measuring electrodes.

Two embodiments will now be described with reference to FIGS. 2A, 2B and 3 respectively.

Figure 2A:
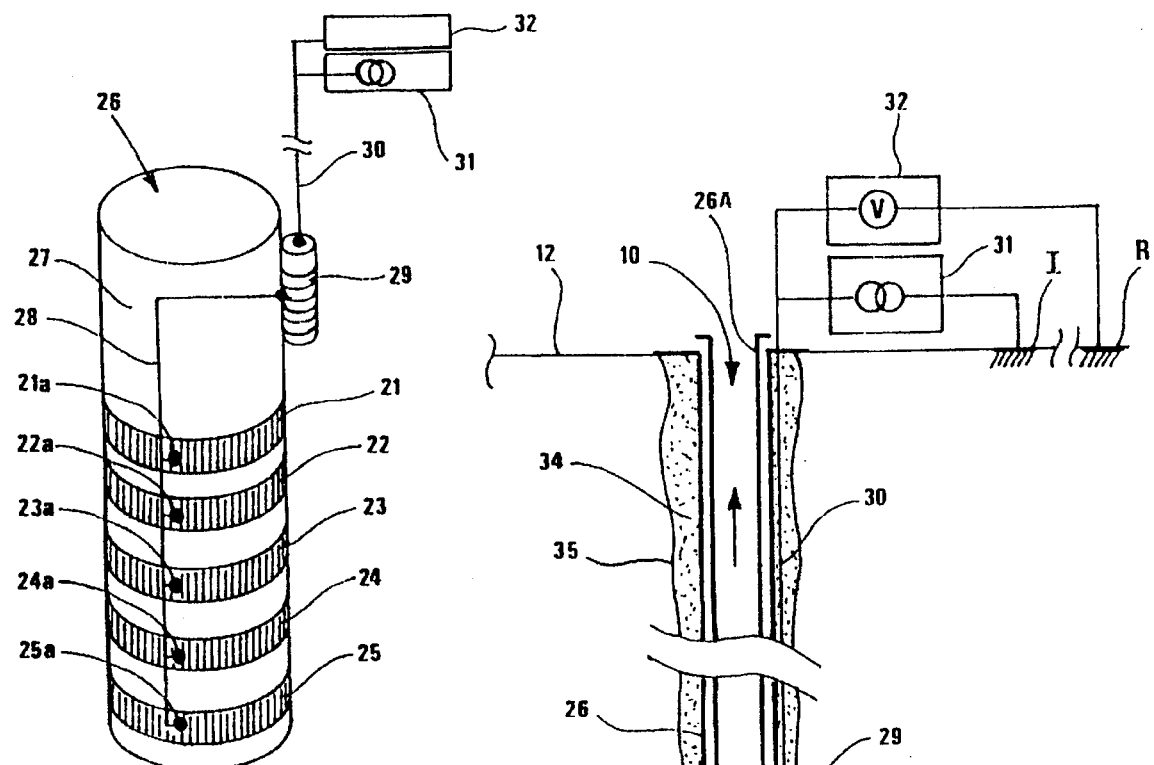
FIG. 2A is an enlarged schematic view of a first embodiment of a device according to the invention.

In FIG. 2A there is shown a first embodiment of a device according to the invention, formed by an array of electrodes 21 to 25, it being understood that the device can comprise a number of electrodes much greater than in the shown embodiment. These are formed by rings of conductive material (copper or the like) fixed permanently on a cylindrical tube 26 forming the casing of a production well. The casing 26 has a coating in the form of a film or jacket of electrically insulating material with the reference 27 on its outer wall receiving the electrodes. The electrodes 21 to 25 are connected by contacts 21a, 22a, 23a, 24a and 25a and a cable connection 28 to electronic means 29 shown symbolically in the figure and fixed to the outside of the casing 26. The electronic means 29 are connected to the surface by an electric connecting cable 30, connected to a current source 31 (alternating or continuous) and processing means 32 for measuring information received from the region of the electrodes. The measurements consist in measuring the injected current and the potential differences between each of the electrodes 21 to 25 and the abovementioned reference electrode. The electronic means located near to the electrodes in the well allow the signals received from the electrodes to be shaped for sending to the surface via the cable 30 and also allow the current or any other signal to be fed to the electrodes.

Figure 2B:
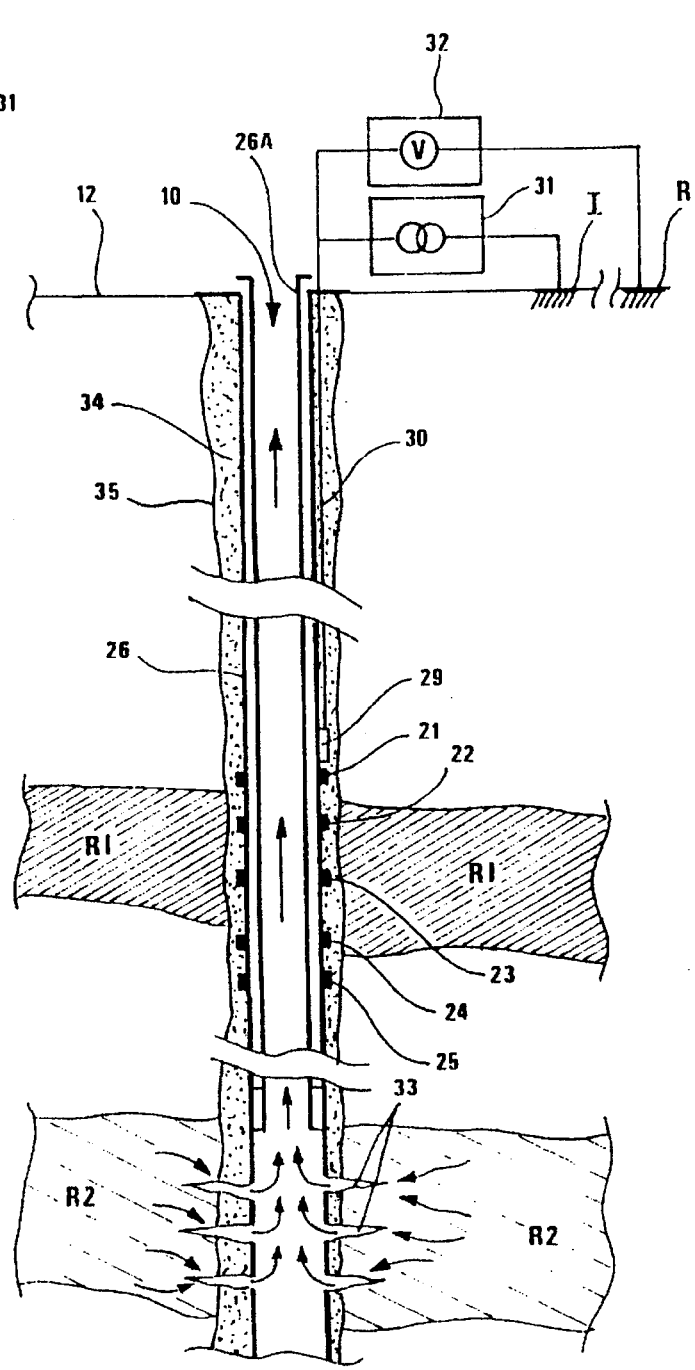
FIG. 2B is a schematic sectional view of a well equipped with the device of FIG. 2A.

FIG. 2B shows a production well 10 fitted with the device of FIG. 2A, with casing 26 and a production string 26A passing through two fluid reservoirs R1 and R2. The reservoir R2, located at a greater depth than the reservoir R1, communicates with the interior of the string 26A through perforations 33 (formed in a manner known per se). The arrows indicate the flow of the fluid (hydrocarbons) from the reservoir R2 to the interior of the string 26A and thence to the surface. The array of electrodes 21 to 25 is positioned on the casing 26 in the region of the reservoir R1 which is not providing fluid to the interior of the string 26A. Cement 34 is injected in a manner known per se into the annular space between the outer wall of the casing 26 and the wall 35 of the well 10. The electrodes are insulated by the casing 26 and the cement 34 from the rest of the well and in particular from the fluid flowing into string 26A from reservoir R2.

The means for passing current in the reservoir R1 include an injection electrode I located at the surface, a current source 31 and an electrical connection connecting the electrode I and the source 31 and the measuring electrodes 21 to 25.

The measuring means 32 include a reference electrode R located at the surface and a potentiometer connected to the electrodes 21 to 25.

Figure 3:
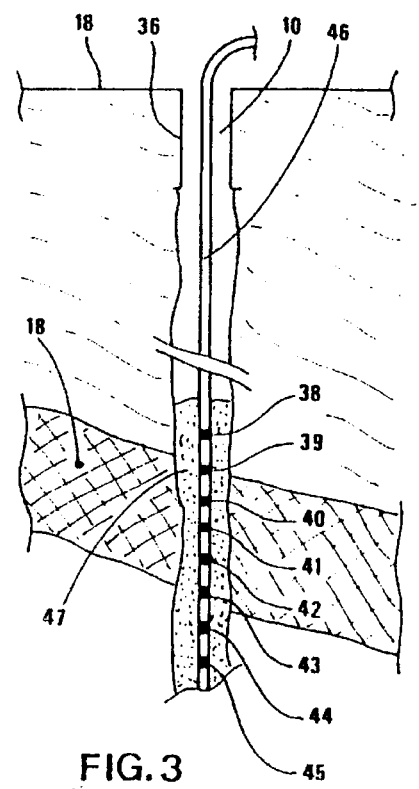
FIG. 3 is a schematic view to a smaller scale of a second embodiment of a device according to the invention.

In another embodiment, shown schematically in FIG. 3, the device of the invention comprises a plurality of electrodes 38 to 45, spaced apart longitudinally in the well 10 and mounted on a tube of small diameter, of flexible material and having the general reference 46. The tube is lowered from the surface 12 into the interior of the well 10, in known manner. The measurement means and the current injection means are not shown for the sake of clarity.

The electrodes 38 to 45 are located and fixed permanently in the well 10 in the region of the production zone 18, by means of an annular mass of cement 47 injected from the surface, to a depth slightly greater than the height of the set of electrodes. The cement also ensures electrical coupling of the electrodes to the reservoir, it being noted that the cement has an electrical resistivity in the same order as the geological strata encountered. In any event the resistivity of the cement is known, so that corrections for the presence of the annular mass of cement between the measuring electrodes and the wall of the well, and thus the corresponding geological formations, can be carried out.

In FIGS. 2A and 2B, the electrodes 21 to 25 are placed permanently in the well and they are also electrically coupled to the reservoir by injecting cement to fill the annular space defined by the outer surface of the casing and the wall of the well (not shown in FIG. 2A for the sake of clarity).

It will be understood that different arrangements are possible for the electrode array. For instance, instead of the above-described support of insulating material carrying conductive annular sections which form the electrodes, an electrical cable comprising insulated conductors within an insulating sheath, in a number at least equal to the desired number of electrodes, may be used. Each electrode is preferably formed in the same manner as the well-known "bridle" in a logging cable: each electrode associated with a given conductor is formed by the exposed end portion of the respective conductor itself, that is to say, this end portion has no insulation thereon and passes through the insulating sheath of the cable so as to lie outside the sheath. Preferably, the exposed conductor is wound around the cable sheath in a coil-like arrangement, and set in place by means of an appropriate adhesive or resin leaving exposed the outer part of the coiled conductor. Provision is also made to seal the holes which have to be provided in the outer sheath of the cable in order to pass there through the end portions of the conductors, so as to prevent ingress of well fluids.

In either of the embodiments of the invention (FIG. 2B or 3), the vertical array of electrodes is located in a well in the region of the reservoir, without the electrodes coming into contact with the fluid (hydro carbons) flowing into the production well. The cement and/or the casing 26 allow the electrodes to be insulated from the fluid in the well.

In the embodiment of FIG. 3, the array of measuring electrodes is fixed in a well separate from the production well through which the hydro carbons are conveyed to the surface. The measurement well where the electrodes are fixed may be a well specifically drilled for this purpose or it may equally be an existing well now used for measurement. It is possible for example to drill a well specifically for measurement, relatively cheaply compared with a conventional well, by a technique called coiled tubing drilling, in which a casing or rigid metal tube with a relatively small diameter of some centimeters, is wound on a winch of large diameter (in the order of 15 meters) and fitted with drilling means at its end. This technique makes it possible to reduce the drilling costs significantly and thus to drill a well specifically for measurement purposes at relatively low cost. Only the upper part of the well, extending over some tens of meters, has a casing 36 known per se.

Various possible ways of implementing the method of the invention are described below with reference to FIGS. 4 to 7.

Figure 4:
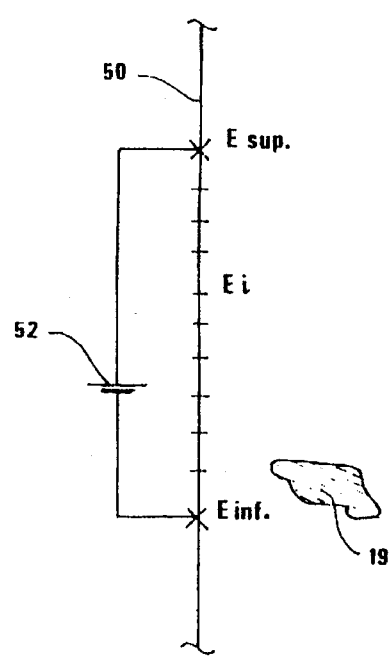

In FIG. 4 the elongate support means is shown as a vertical line 50, whether in the form of the casing 26 (FIG. 2) or in the form of an insulating flexible tube 46 (FIG. 3). A current source 52 connects an upper electrode Esup and a lower electrode Einf. The current or potential source 52 is located at the surface.

A set of electrodes Ei is disposed on the elongated support 50, preferably spaced regularly between the electrode Esup and the electrode Einf.

In the implementation in FIG. 4, the potential difference is measured between the reference electrode and one of the electrodes Ei, called intermediate electrodes.

By way of example, the current or voltage source (referenced 52) is in the order of 1 amp or several amps.

Other things being equal, it is possible to trace a curve of potential as a function of depth by making a measurement at each of the intermediate electrodes Ei. Thus each electrode Ei corresponds to a given depth.

Figure 5:
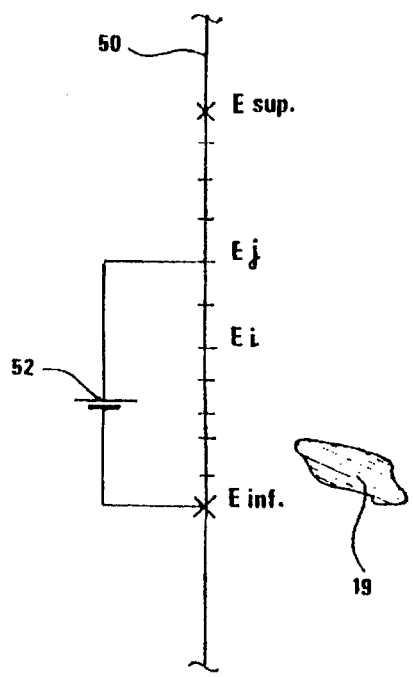

In another implementation, shown in FIG. 5, the source of voltage 52 connects the electrode Einf and a given intermediate electrode Ej. The various potential difference measurements are made at each of the intermediate electrodes Ei other than the intermediate electrode Ej connected to the current source. This variant makes it possible to detect a possible pocket of water or gas 19 which, in the example shown, is located near the lower electrode Einf. Thus, in the diagram of FIG. 4, the presence of the pocket of water 19 has little chance of being detected, taking account of the distance between the electrode Esup and the pocket of water. In the embodiment of FIG. 5, the proximity of the return electrode Ej increases the chances of detecting the pocket of water 19.

Coupling and connection means, including the cable 35, known in themselves and not shown, are provided in order to connect the current source 52, located at the surface, to any one of the electrodes to provide the current input electrode and to any one of the electrodes to form the current return electrode in the set of the array of electrodes. It is thus possible to effect a series of measurements such as described in connection with FIG. 4, then to effect another series of measurements such as described in connection with FIG. 5. Each series of measurements gives rise to a curve of potential as a function of depth, each curve then allowing detection of the possible presence of an anomaly, such as a pocket of water or gas 19.

Figure 6:
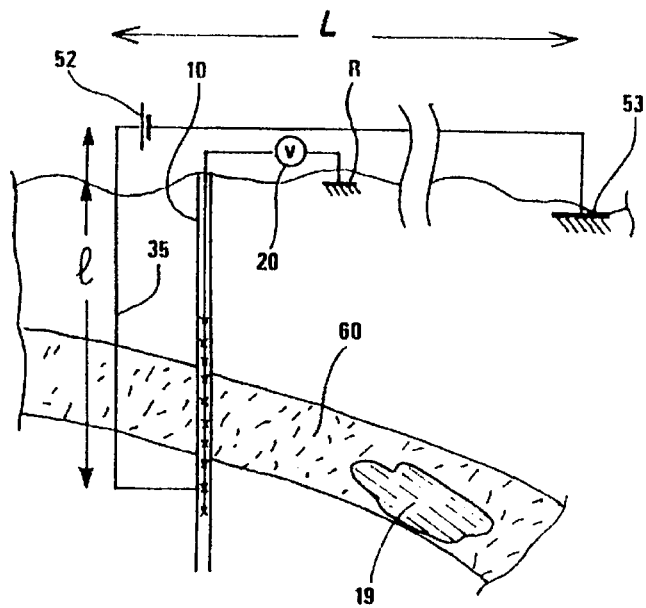
FIGS. 4, 5, and 6 show schematically various implementations of a method according to the invention.

FIG. 6 shows an embodiment in which the current source 52 is connected to an electrode, called earth or ground and located at a relatively large distance from the well 10, that is to say, one kilometer for example (distance L) and to a measuring electrode located in the well. The location of the electrode 53 remote from the well 10 forces the current lines to pass through the region to be surveyed, which increases the chances of detecting the presence of a pocket of water 19 crossing the stratum 60 producing the hydrocarbons and traversed by the well 10.

The cable 35 connecting the electronic circuitry 29 located adjacent the measuring electrode to the surface has a length of several kilometers, (for example 3 kilometers), which implies a resistivity of around 80 ohms; assuming a current of 20 amps flowing in the cable 35, it will be necessary to use a voltage source of 1,600 volts. This high tension can lead to difficulties from the standpoint of electrical insulation and thus of safety.

DC voltage further suffers from the drawback that electrodes are subject to erosion and polarization. As a variant, a source of low frequency AC voltage, for example at 5 Hz, can be used, which avoids these difficulties and further improves the signal-to-noise ratio.

Figure 7:
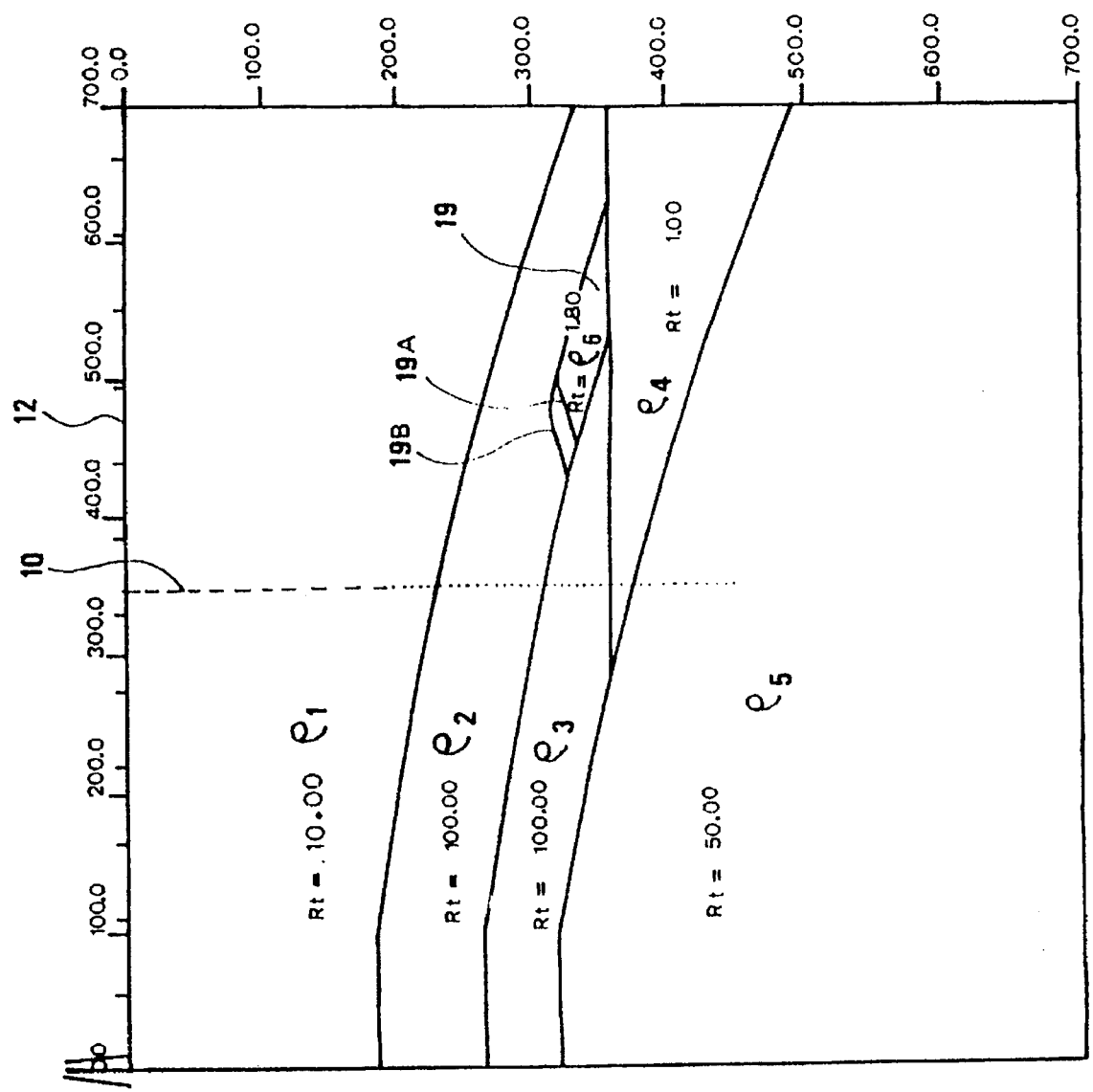
FIG. 7 is a section on a vertical plane of a model of geological formations traversed by a borehole and including a hydrocarbon reservoir.

FIG. 7 is a diagrammatic sectional view on a vertical plane of a ground formation having a succession of strata with electrical resistivities symbolized by the parameters $\rho_1$ to $\rho_6$. For example, going from the surface, the first, surface stratum has a resistivity $\rho_1$ of 10 ohm.m, the second stratum has a resistivity $\rho_2$ of 100 ohm.m, the third stratum has a resistivity $\rho_3$ of 100 ohm.m, the fourth stratum has a resistivity $\rho_4$ of 1 ohm.m, and the last stratum has a resistivity $\rho_5$ of 50 ohm.m.

A pocket of water with the reference 19 is located at a depth of around 320 to 350 meters, at the junction of strata Nos. 2, 3 and 4, the latter forming a kind of wedge intersecting strata Nos. 2 and 3 on a substantially horizontal plane. The pocket of water 19 tends to move towards the production well 10 passing through the production stratum as the hydrocarbons move from the production stratum towards the well. The pocket of water 19 thus has a leading face 19A in a first position; later the face has a position 19B, closer to the well 10. The faces 19A and 19B have a surface substantially inclined relative to the well and in the order of 10 meters high for example.

The device of the invention makes it possible firstly to detect the pocket of water and also to measure the advance thereof as production takes place. For example, with an array of electrodes 100 meters long, it is possible to detect movement of a front of water with a length of 10 meters, and to do so at a distance greater than 50 meters. The accuracy of the measurement can be improved by providing additional measurements, performed in other boreholes traversing the production region and also equipped with an array of measuring electrodes.

Using the theoretical model shown in FIG. 7, a simulation yields synthetic data representative of the variations of potential as a function of depth, measured at different electrodes, each corresponding to a given depth. A first data set is obtained for face 19A in the first position as defined above and a second data set for face 19B in the second position corresponding to a later time.

By forming the difference between the two data sets, the influence of the position of the water front on the potential variation vs. depth is evaluated. It is noted that the injected current is high enough, e.g. 1 amp, so as to generate a significant variation in potential, of the order of one or several millivolts, from which it is possible to infer the displacement of the water front and thus of the water pocket 19.

We claim:

1. A method for monitoring a fluid reservoir traversed by at least one well, comprising the steps of:
   providing at least one electrode fixed in said well and communicating to the surface;
   hydraulically isolating the section of said well in which said electrode is located from the rest of said well;
   providing electrical coupling between said electrode and said reservoir;
   passing a current through said reservoir; and
   measuring by means of said electrode an electrical parameter, whereby a characteristic representative of said reservoir can be deduced.

2. A method according to claim 1, further comprising providing a plurality of electrodes disposed on a support adapted to maintain a given spacing between said electrodes and to isolate said electrodes from one another; and fixing said support in said well.

3. A method according to claim 2, wherein said support is formed by a rigid metal tube with an electrically insulating coating.

4. A method according to claim 2, wherein said support is formed by an elongate member of non-rigid, electrically insulating material.

5. A method according to claim 4, wherein said reservoir includes a production well and said electrodes are located in a well separate from said production well.

6. A method according to claim 2, wherein said electrodes are fixed in said well by means of cement injected between said electrodes and the wall of said well.

7. A method according to claim 2, wherein said plurality of electrodes includes a plurality of measuring electrodes and a current injection electrode fixed in said well.

8. A method according to claim 7, wherein said plurality of electrodes further includes a reference electrode and wherein the potential difference is measured between said reference electrode and at least one measuring electrode with different electrodes providing for the current return.

9. A method according to claim 7, wherein either one of said injection electrode and said reference electrode is disposed on the surface.

10. A method according to claim 7, wherein measurements are made that are spaced apart in time and the difference between said measurements is calculated in order to determine a parameter representative of the movement of said fluids in said reservoir.

11. A method according to claim 9, wherein measurements are made that are spaced apart in time and the difference between said measurements is calculated in order to determine a parameter representative of the movement of said fluids in said reservoir.

12. An apparatus for monitoring a fluid reservoir traversed by at least one well, comprising:
   at least one electrode fixed in said well and communicating to the surface;
   means for hydraulically isolating the section of said well in which said electrode is located from the rest of said well;
   means for providing electrical coupling between said electrode and said reservoir;
   means for passing a current through said reservoir; and
   means for measuring by means of said electrode an electrical parameter, whereby a characteristic representative of said reservoir can be deduced.

13. Apparatus according to claim 12, further comprising a plurality of electrodes which are disposed on a support adapted to maintain a given spacing between said electrodes and to isolate said electrodes from one another.

14. Apparatus according to claim 13, wherein said support is formed by a rigid metal tube with an electrically insulating coating.

15. Apparatus according to claim 13, wherein said support is formed by an elongate member of non-rigid, electrically insulating material.

16. Apparatus according to claim 15, wherein said reservoir includes a production well and said electrodes are located in a well separate from said production well.

17. Apparatus according to claim 13, wherein said electrodes are fixed in said well by means of cement injected between said electrodes and the wall of said well.

18. Apparatus according to claim 13, wherein said plurality of electrodes includes a plurality of measuring electrodes and a current injection electrode fixed in said well.

19. Apparatus according to claim 18, wherein said plurality of electrodes further includes a reference electrode and wherein the potential difference is measured between said reference electrode and at least one measuring electrode with different electrodes providing for the current return.

20. Apparatus according to claim 18, wherein either one of said injection electrode and said reference electrode is disposed on the surface.

21. Apparatus according to claim 18, wherein measurements are made that are spaced apart in time and the difference between said measurements is calculated in order to determine a parameter representative of the movement of said fluids in said reservoir.

22. Apparatus according to claim 20, wherein measurements are made that are spaced apart in time and the difference between said measurements is calculated in order to determine a parameter representative of the movement of said fluids in said reservoir.

23. A method for monitoring a fluid reservoir traversed by wells, comprising the steps of:

provinding at least one electrode fixed in one of said wells and communicating to the surface;

hydraulically isolating the section of said well in which said electrode is located from the rest of said well;

providing electrical coupling between said electrode and said reservoir;

establishing a current through said reservoir; and measuring by means of said electrode an electrical parameter, whereby a characteristic representative of said reservoir can be deduced.

24. A method according to claim 23, further comprising a plurality of electrodes disposed on a support adapted to maintain a given spacing between said electrodes and to isolate said electrodes from one another; and fixing said support in one of said wells.

25. A method according to claim 24, wherein said support is formed by a rigid metal tube with an electrically insulating coating.

26. A method according to claim 24, wherein said support is formed by an elongate member of non-rigid, electrically insulating material.

* * * * *